US008649639B2

(12) United States Patent
Mekis et al.

(10) Patent No.: US 8,649,639 B2
(45) Date of Patent: Feb. 11, 2014

(54) METHOD AND SYSTEM FOR WAVEGUIDE MODE FILTERS

(75) Inventors: Attila Mekis, Carlsbad, CA (US); Thierry Pinguet, Cardiff-by-the-Sea, CA (US)

(73) Assignee: Luxtera, Inc., Carlsbad, CA (US)

( * ) Notice: Subject to any disclaimer, the term of this patent is extended or adjusted under 35 U.S.C. 154(b) by 234 days.

(21) Appl. No.: 13/037,935

(22) Filed: Mar. 1, 2011

(65) Prior Publication Data

US 2011/0217002 A1  Sep. 8, 2011

Related U.S. Application Data

(60) Provisional application No. 61/339,903, filed on Mar. 4, 2010.

(51) Int. Cl.
*G02B 6/12* (2006.01)

(52) U.S. Cl.
USPC .................................................. 385/14

(58) Field of Classification Search
None
See application file for complete search history.

(56) References Cited

U.S. PATENT DOCUMENTS

| | | | |
|---|---|---|---|
| 5,629,999 A * | 5/1997 | Henry et al. | 385/43 |
| 7,167,489 B2 * | 1/2007 | Kawakami et al. | 372/19 |
| 7,174,080 B2 * | 2/2007 | Walker | 385/131 |
| 7,738,523 B2 * | 6/2010 | Hatori et al. | 372/45.01 |
| 7,978,941 B2 * | 7/2011 | Li | 385/14 |
| 2002/0031304 A1 * | 3/2002 | Roberts et al. | 385/43 |
| 2004/0037503 A1 * | 2/2004 | Hastings et al. | 385/37 |
| 2004/0131310 A1 * | 7/2004 | Walker | 385/29 |
| 2005/0123259 A1 * | 6/2005 | Gunn et al. | 385/129 |
| 2006/0233504 A1 * | 10/2006 | Hochberg et al. | 385/129 |
| 2007/0189669 A1 * | 8/2007 | Tormen et al. | 385/37 |
| 2007/0248134 A1 * | 10/2007 | Hatori et al. | 372/45.01 |
| 2007/0280326 A1 * | 12/2007 | Piede et al. | 372/102 |
| 2008/0002928 A1 * | 1/2008 | Li | 385/14 |
| 2008/0273563 A1 * | 11/2008 | Schmidt et al. | 372/45.01 |
| 2011/0150010 A1 * | 6/2011 | Huang et al. | 372/6 |

* cited by examiner

*Primary Examiner* — Sung Pak
(74) *Attorney, Agent, or Firm* — McAndrews, Held & Malloy (57) ABSTRACT

A method and system for waveguide mode filters are disclosed and may include processing optical signals of a fundamental mode and higher-order modes by filtering the higher-order modes in rib waveguides in a photonic chip. The higher-order modes may be filtered utilizing doped regions and/or patterns in one or more slab sections in the rib waveguides. The patterns may be periodic or aperiodic along the rib waveguides. The higher-order modes may be filtered utilizing varying widths of slab sections, or doped, patterned, and/or salicided ridges on the slab sections in the rib waveguides. The higher-order modes may be attenuated by scattering and/or absorbing the modes. The chip may comprise a CMOS photonic chip.

72 Claims, 9 Drawing Sheets

METHOD AND SYSTEM FOR WAVEGUIDE MODE FILTERS

CROSS-REFERENCE TO RELATED APPLICATIONS/INCORPORATION BY REFERENCE

This application makes reference to and claims priority to U.S. Provisional Application Ser. No. 61/339,903 filed on Mar. 4, 2010, which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to signal processing. More specifically, certain embodiments of the invention relate to a method and system for waveguide mode filters.

BACKGROUND OF THE INVENTION

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Optical communication systems have been widely adopted for applications ranging from internet backbone, local area networks, data centers, supercomputing, to high-definition video. Due to superior bandwidth and low loss, optical fibers are the medium of choice for transporting high-speed binary data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for waveguide mode filters, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for waveguide mode filters. Exemplary aspects of the invention may comprise processing optical signals of a fundamental mode and higher order modes by filtering the higher-order modes in rib waveguides in a photonic chip. The higher-order modes may be filtered utilizing doped regions and/or patterns in one or more slab sections in the rib waveguides. The patterns may be periodic or aperiodic along the rib waveguides. The higher-order modes may be filtered utilizing varying widths of slab sections, or doped, patterned, and/or salicided ridges on the slab sections in the rib waveguides. The higher-order modes may be attenuated by scattering and/or absorbing the modes. The chip may comprise a CMOS photonic chip.

Figure 1A:
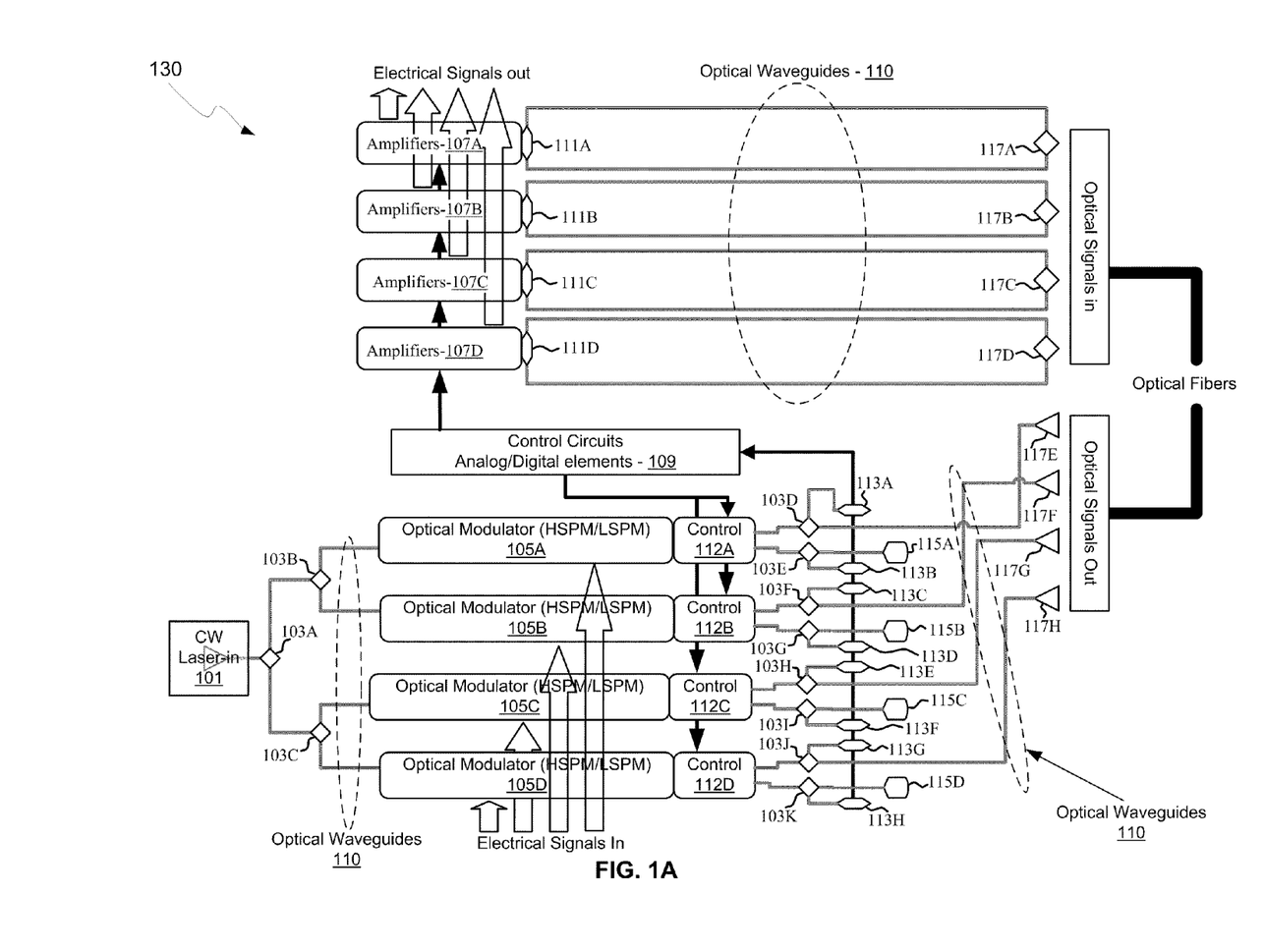
FIG. 1A is a block diagram of a photonically enabled CMOS chip comprising waveguide mode filters, in accordance with an embodiment of the invention.

FIG. 1A is a block diagram of a photonically enabled CMOS chip comprising waveguide mode filters, in accordance with an embodiment of the invention. Referring to FIG. 1A, there is shown optoelectronic devices on a CMOS chip 130 comprising optical modulators 105A-105D, photodiodes 111A-111D, monitor photodiodes 113A-113H, and optical devices comprising taps 103A-103K, optical terminations 115A-115D, and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

Optical signals are communicated between optical and optoelectronic devices via optical waveguides 110 fabricated in the CMOS chip 130. Single-mode waveguides may be used in photonic integrated circuits because single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode whose polarization is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab.

Opto-electronic devices, such as light modulators or photodetectors, may have both optical and electrical interfaces. If the electrical contacts are in close proximity to where the optical mode is located, this may cause unacceptable optical losses, degrading the performance of the device. This attenuation may be mitigated by extending the electrical path by doping the dielectric layer that defines the waveguide and move the electrical contacts to an area where the optical mode has less intensity. For strip waveguides, this typically requires increasing the waveguide cross-section beyond the maximum width necessary for single-mode operation. Therefore, rib waveguides may be used with contacts on the slab portion away from the optical mode to reduce attenuation in opto-electronic circuits.

The optical modulators 105A-105D comprise Mach-Zehnder or ring modulators, for example, and enable the modulation of the CW laser input signal. The optical modulators 105A-105D comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

The phase modulators may have a dual role: to compensate for the passive biasing of the MZI and to apply the additional phase modulation used to modulate the light intensity at the output port of the MZI according to a data stream. The former phase tuning and the latter phase modulation may be applied by separate, specialized devices, since the former is a low speed, slowly varying contribution, while the latter is typically a high speed signal. These devices are then respectively referred to as the LSPM and the HSPM. Examples for LSPM are thermal phase modulators (TPM), where a waveguide portion is locally heated up to modify the index of refraction of its constituting materials, or forward biased PIN junctions (PINPM) where current injection into the PIN junction modifies the carrier density, and thus the index of refraction of the semiconductor material. An example of an HSPM is a reversed biased PIN junction, where the index of refraction is also modulated via the carrier density, but which allows much faster operation, albeit at a lower phase modulation efficiency per waveguide length.

The outputs of the modulators 105A-105D may be optically coupled via the waveguides 110 to the grating couplers 117E-117H. The taps 103D-103K comprise four-port optical couplers, for example, and are utilized to sample the optical signals generated by the optical modulators 105A-105D, with the sampled signals being measured by the monitor photodiodes 113A-113H. The unused branches of the taps 103D-103K are terminated by optical terminations 115A-115D to avoid back reflections of unwanted signals.

The grating couplers 117A-117H comprise optical gratings that enable coupling of light into and out of the CMOS chip 130. The grating couplers 117A-117D may be utilized to couple light received from optical fibers into the CMOS chip 130, and the grating couplers 117E-117H may be utilized to couple light from the CMOS chip 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the CMOS chip 130 to optimize coupling efficiency. In an embodiment of the invention, the optical fibers may comprise single-mode fiber (SMF) and/or polarization-maintaining fiber (PMF).

In another exemplary embodiment, optical signals may be communicated directly into the surface of the CMOS chip 130 without optical fibers by directing a light source on an optical coupling device in the chip, such as the light source interface 135 and/or the optical fiber interface 139. This may be accomplished with directed laser sources and/or optical sources on another chip flip-chip bonded to the CMOS chip 130.

The photodiodes 111A-111D may convert optical signals received from the grating couplers 117A-117D into electrical signals that are communicated to the amplifiers 107A-107D for processing. In another embodiment of the invention, the photodiodes 111A-111D may comprise high-speed heterojunction phototransistors, for example, and may comprise germanium (Ge) in the collector and base regions for absorption in the 1.55 µm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the CMOS chip 130. The control sections 112A-112D comprise electronic circuitry that enable modulation of the CW laser signal received from the splitters 103A-103C. The optical modulators 105A-105D may require high-speed electrical signals to modulate the refractive index in respective branches of a Mach-Zehnder interferometer (MZI), for example. In an embodiment of the invention, the control sections 112A-112D may include sink and/or source driver electronics that may enable a bidirectional link utilizing a single laser.

In operation, the CMOS chip 130 may be operable to transmit and/or receive and process optical signals. The grating couplers 117A-117D may be operable to receive optical signals from optical fibers coupled to the chip 130 and may convert the optical mode of the fiber into the much smaller mode of a Si waveguide fabricated on the CMOS SOI wafer. The grating couplers 117A-117D may comprise a single-polarization or a polarization-splitting type: in the first case, only a specific polarization is coupled to a single Si waveguide, while in the second case, two orthogonal polarizations are split into two output waveguides.

In an exemplary embodiment of the invention, rib waveguides may be utilized to communicate optical signals within the CMOS chip 130. Electrical contacts near the waveguides may cause excessive attenuation of the desired optical mode, and widening the waveguide to reduce the attenuation of the desired signal may cause higher order modes to propagate in the structure. Various waveguide mode filters may be utilized to remove these unwanted higher order modes in the waveguide structures, such as through doping or patterning of the slab section in a rib waveguide structure. Similarly, salicidation of a ridge structure adjacent to the rib may attenuate unwanted modes with minimal impact on the desired mode.

Figure 1B:
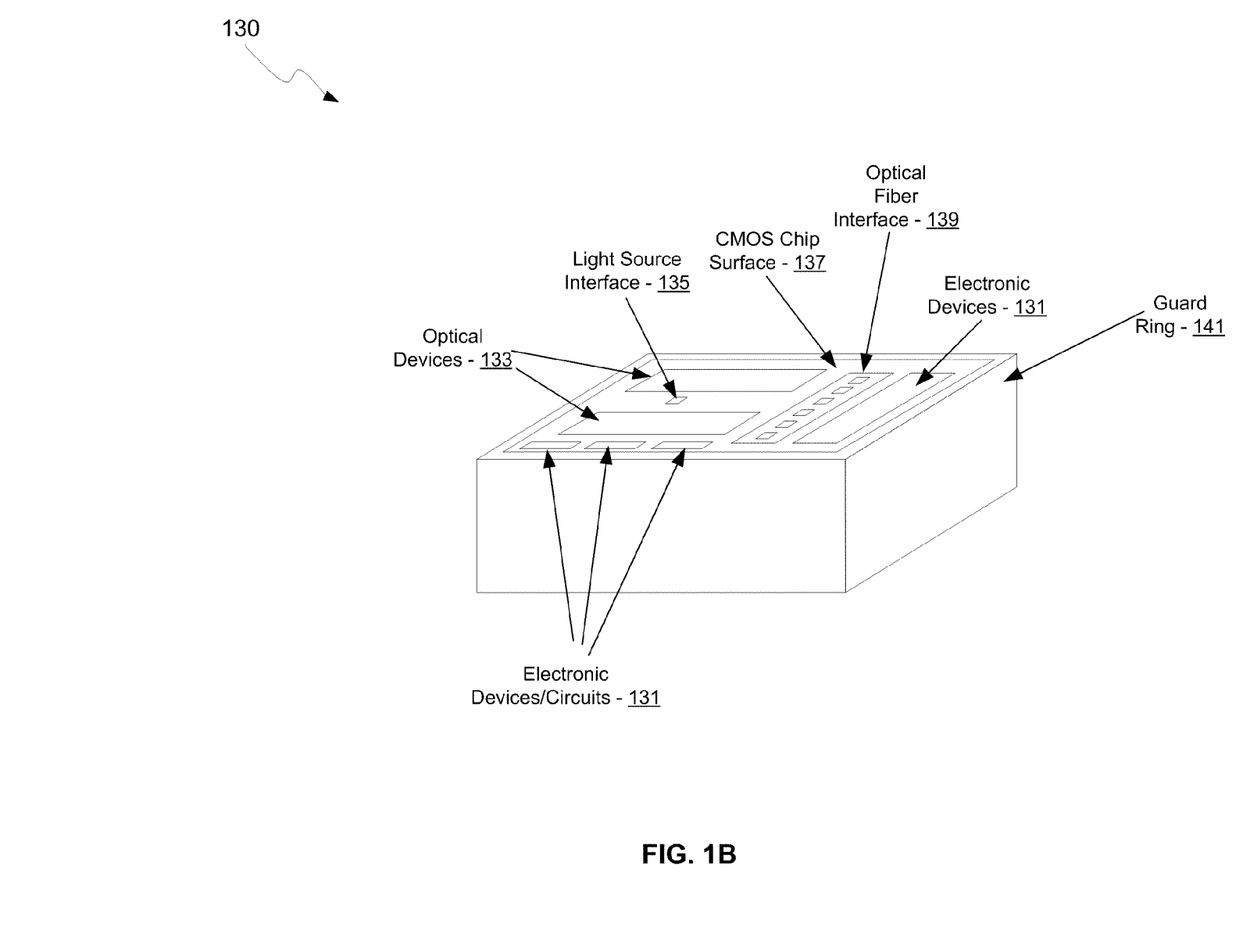
FIG. 1B is a diagram illustrating an exemplary CMOS chip, in accordance with an embodiment of the invention.

FIG. 1B is a diagram illustrating an exemplary CMOS chip, in accordance with an embodiment of the invention. Referring to FIG. 1B, there is shown the CMOS chip 130 comprising electronic devices/circuits 131, optical and optoelectronic devices 133, a light source interface 135, CMOS chip front surface 137, an optical fiber interface 139, and CMOS guard ring 141.

The light source interface 135 and the optical fiber interface 139 comprise grating couplers, for example, that enable coupling of light signals via the CMOS chip surface 137, as opposed to the edges of the chip as with conventional edge-emitting devices. Coupling light signals via the CMOS chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the taps 103A-103K, optical terminations 115A-115D, grating couplers 117A-117H, optical modulators 105A-105D, high-speed heterojunction photodiodes 111A-111D, and monitor photodiodes 113A-113H.

In an embodiment of the invention, waveguides in the CMOS chip 130 may be configured to remove unwanted higher order modes in the waveguide structures, such as through doping or patterning of the slab section in a rib waveguide structure. Similarly, salicidation of a ridge structure adjacent to the rib may attenuate unwanted modes with minimal impact on the desired mode.

Figure 1C:
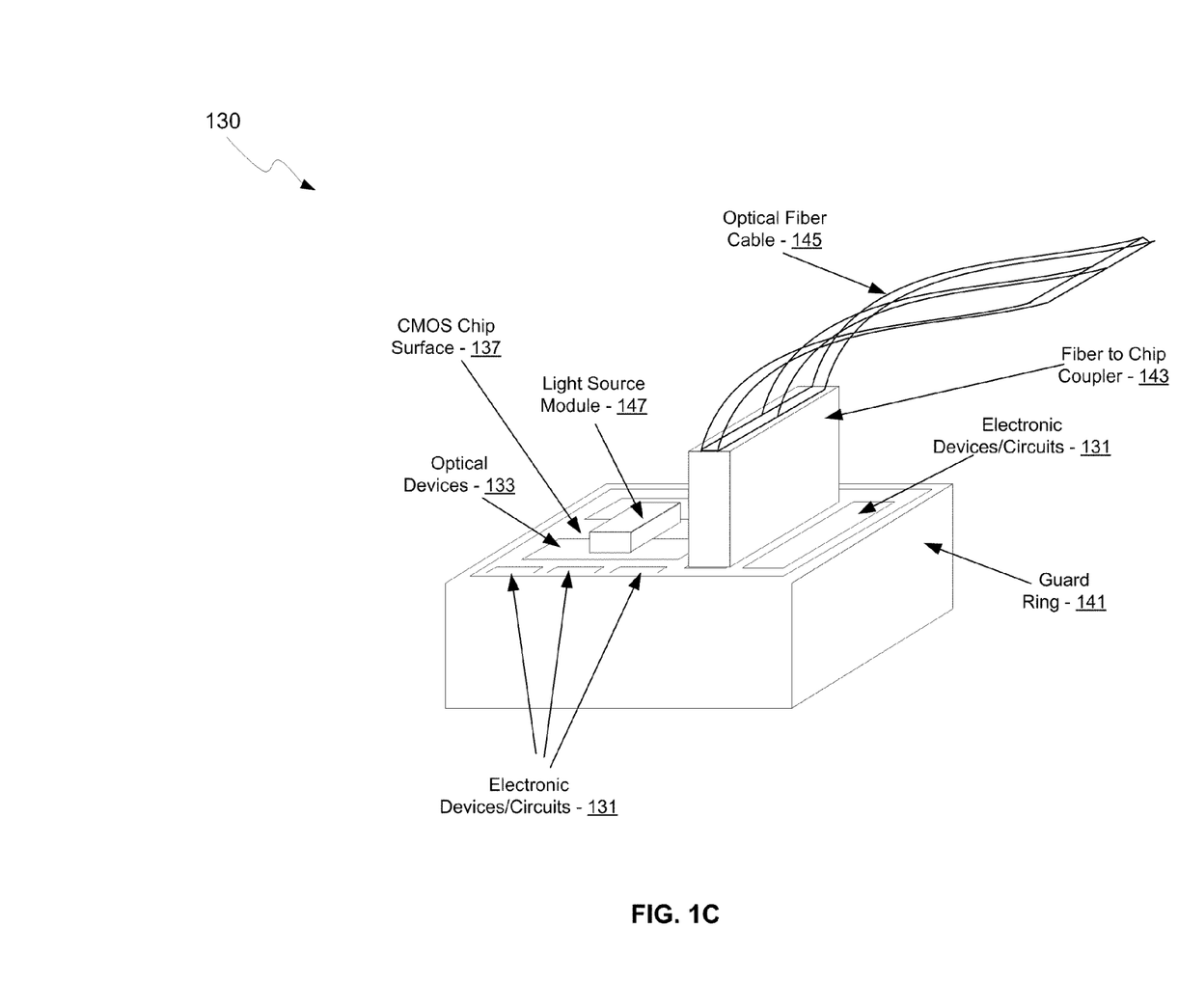
FIG. 1C is a diagram illustrating an exemplary CMOS chip coupled to an optical fiber cable, in accordance with an embodiment of the invention.

FIG. 1C is a diagram illustrating an exemplary CMOS chip coupled to an optical fiber cable, in accordance with an embodiment of the invention. Referring to FIG. 1C, there is shown the CMOS chip 130 comprising the CMOS chip surface 137, and the CMOS guard ring 141. There is also shown a fiber-to-chip coupler 143, an optical fiber cable 145, and an optical source assembly 147.

The CMOS chip 130 comprising the electronic devices/circuits 131, the optical and optoelectronic devices 133, the light source interface 135, the CMOS chip surface 137, and the CMOS guard ring 141 may be as described with respect to FIG. 1B.

In an embodiment of the invention, the optical fiber cable may be affixed, via epoxy for example, to the CMOS chip surface 137. The fiber chip coupler 143 enables the physical coupling of the optical fiber cable 145 to the CMOS chip 130.

In an embodiment of the invention, waveguides in the CMOS chip 130 may be configured to remove unwanted higher order modes in the waveguide structures, such as through doping or patterning of the slab section in a rib waveguide structure. Similarly, salicidation of a ridge structure adjacent to the rib may attenuate unwanted modes with minimal impact on the desired mode.

Figure 2:
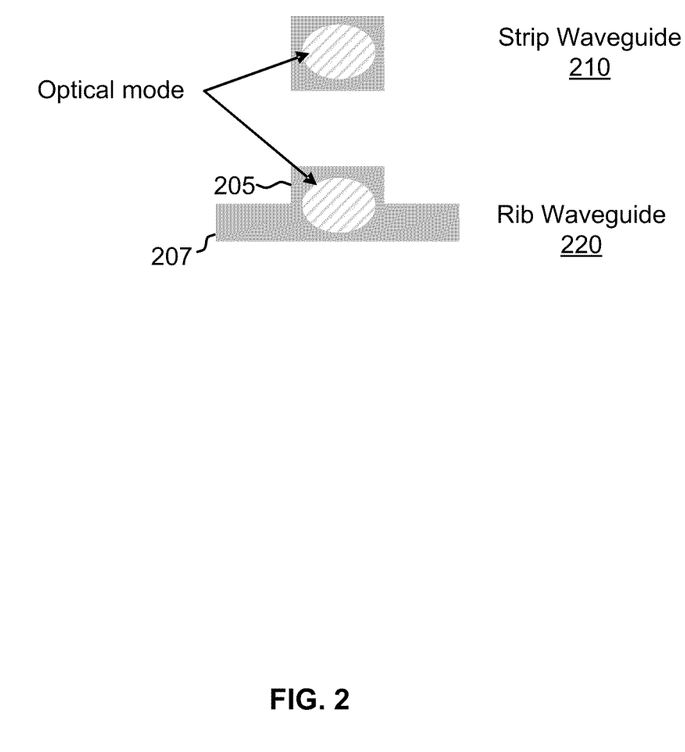
FIG. 2 is a block diagram of strip and rib optical waveguides, in accordance with an embodiment of the invention.

FIG. 2 is a block diagram of strip and rib optical waveguides, in accordance with an embodiment of the invention. Referring to FIG. 2, there is shown a strip waveguide 210 and a rib waveguide 220. The strip waveguide 210 may comprise a dielectric material surrounded by a material of a lower dielectric constant, thereby confining one or more optical modes. A single-mode waveguide may be configured by reducing the dimensions of the strip to below that which results in multiple modes.

The rib waveguide 220 comprises a rib 205 and a slab 207. Rib waveguides are considered single-mode when the slab is infinitely extended. Extended modes may exist inside the slab 207, but may be leaky, that is, not confined horizontally and are therefore not guided with low loss like the fundamental mode. However, if the slab is terminated at a certain distance from the rib, the undesired modes may propagate. Terminating the slab 207 may be advantageous in that it may prevent electrical or optical signal cross-talk. If an optoelectronic circuit is fabricated in a CMOS process with a trench isolation etch for transistors where the optical circuit is in the same layer as the electronics, then the slab is typically terminated to allow transistors to function as intended.

When the slab is terminated, the waveguide may become highly multi-mode, with the modes inside the slab guided with low optical losses. In the slab-terminated rib waveguide geometry, it may be important that higher order modes are not excited in the waveguide. Otherwise, these unwanted modes can interact with the fundamental mode that carries the signal as they propagate through the optical circuitry.

Figure 3:
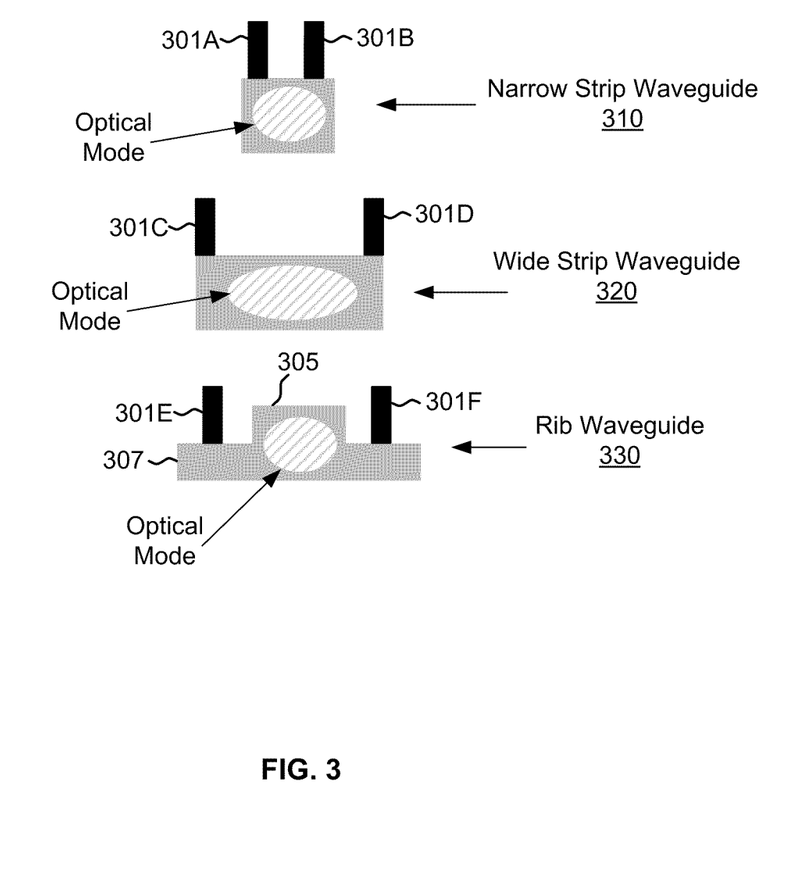
FIG. 3 is a block diagram of exemplary electrical contact configurations for strip and rib optical waveguides, in accordance with an embodiment of the invention.

FIG. 3 is a block diagram of exemplary electrical contact configurations for strip and rib optical waveguides, in accordance with an embodiment of the invention. Referring to FIG. 3, there is shown a narrow strip waveguide 310, a wide strip waveguide 320, and a rib waveguide 330.

The narrow strip waveguide 310 may be substantially similar to the Strip waveguide 210, described with respect to FIG. 2, but also comprising electrical contacts 301A and 301B. The spacing of the electrical contacts within the width of the narrow strip waveguide 301 may result in excessive attenuation of the optical mode. This may be alleviated by increasing the width of the waveguide, which may result in the wide strip waveguide 320. However, a wider waveguide may enable higher order modes to propagate, resulting in a tradeoff between optimum contact placement and optimum single-mode propagation.

This tradeoff between contact placement and strip width may be reduced by utilizing a rib waveguide structure, such as the rib waveguide 330, which comprises a rib 305 and a slab 307. The optical mode may be confined by the rib and slab combination, thereby providing further control in reducing attenuation of desired optical signals in waveguides near electrical contacts. The area of the slab outside the region of the rib may be configured with patterns and/or doping that may attenuate undesired optical modes.

Figure 4:
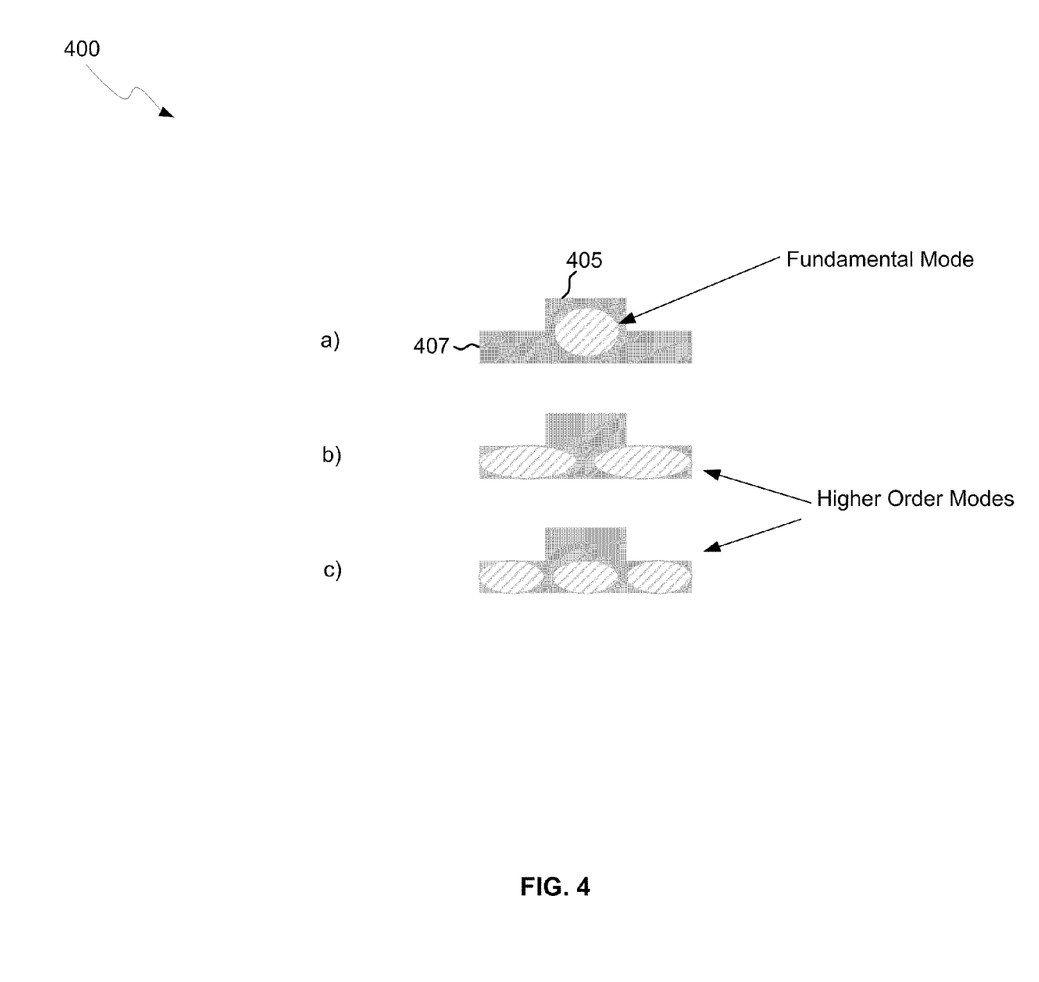
FIG. 4 is a block diagram of exemplary optical modes in rib optical waveguides, in accordance with an embodiment of the invention.

FIG. 4 is a block diagram of exemplary optical modes in rib optical waveguides, in accordance with an embodiment of the invention. Referring to FIG. 4, there is shown a rib waveguide 400 comprising a rib 405 and a slab 407.

The optical modes supported by the rib waveguide 400 may depend on the dimensions and dielectric constant of the material used to fabricate the structure. FIG. 4 a) illustrates a fundamental mode that may propagate through the rib waveguide 400, whereas FIGS. 4 b) and c) illustrate possible higher order modes that may propagate.

It is typically desirable to only propagate the fundamental mode, as illustrated in FIG. 4 a). However, in practice, it may be very difficult to avoid the excitation of higher order modes in the waveguide. In many applications, the light source is external to the chip, or it is integrated in a hybrid fashion. The light source, which may comprise a laser, or a fiber attached to the light source, may require alignment to the waveguide on the chip. The alignment process may be imperfect, or may drift after attachment due to curing or aging of the epoxy used to attach the fiber or laser to the chip. Whatever the source of misalignment, modes in addition to the fundamental mode may be excited to some extent.

Coupling to higher order modes may cause performance degradation if there is cross-coupling between these modes and the fundamental mode carrying the optical signal. Coupling can occur due to process reasons, such as imperfections in the waveguide, or it may occur in the optical devices on the chip.

One example of a device that couples higher order modes to the fundamental mode is a waveguide bend, because the bend breaks the translational symmetry of the straight waveguide. The modes coupled by the bend interfere after propagation through the circuit. As the different order modes propagate at different velocities in the waveguide, the interference may manifest itself as wavelength dependence in the circuit loss characteristics.

Another example of mode coupling occurs in Y-junctions. A Y-junction splits the input light evenly between two waveguides using an adiabatic taper. If a second-order (odd) mode is also present in the waveguide at the device input, it may become a guided mode inside the taper and, due to its symmetry, may cause an imbalance between the output powers in the two output arms.

The effects of these undesired higher order modes may be mitigated by utilizing waveguide mode filters, such as by doping or patterning of the slab section in a rib waveguide structure. Similarly, salicidation of a ridge structure adjacent to the rib may attenuate unwanted modes with minimal impact on the desired mode.

Figure 5:
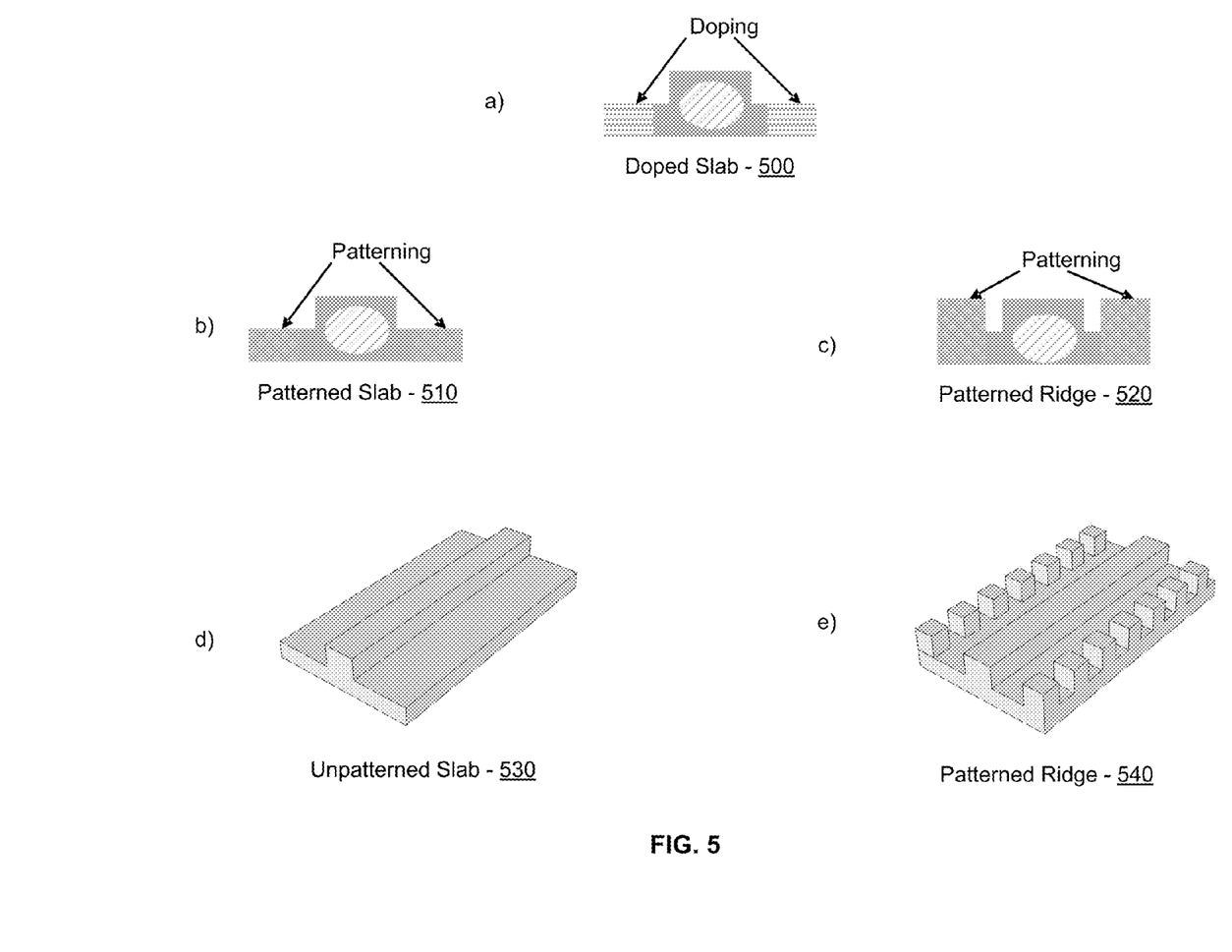
FIG. 5 is a block diagram of exemplary rib optical waveguides, in accordance with an embodiment of the invention.

FIG. 5 is a block diagram of exemplary rib optical waveguides, in accordance with an embodiment of the invention. Referring to FIG. 5, there is shown cross-sectional views of a) a rib waveguide with doped slab 500, b) a rib waveguide with patterned slab 510, c) a rib waveguide with patterned ridge 520, and oblique views of d) a rib waveguide with unpatterned slab 530, and e) a rib waveguide with patterned ridge 540.

The doped slab rib waveguide 500 shown in FIG. 5 a) comprises a doped region in the slab, which may result in attenuation of the undesired higher order modes. The slab region may be implanted with dopants to induce optical absorption for the higher order modes, while maintaining low loss for the fundamental mode in the rib section.

Similarly, the edges of the slab may be patterned as shown in FIG. 5 b) to induce scattering for the higher order modes. The patterning may be periodic along the length of the waveguide to couple selected higher-order modes to radiation modes or may be aperiodic to produce random scattering for these modes. The patterning may be incorporated via ion implantation, chemical etching, material deposition, or other semiconductor processing techniques capable of localized processing or deposition. An unpatterned slab rib waveguide 530 is illustrated in FIG. 5 d).

Another option for mitigating higher order mode propagation is to utilize a ridge structure, as shown in FIGS. 5 c) and e). In these structures, a ridge may be formed near the end(s) of the slab termination. The width of the additional ridge(s) may be chosen to provide optimal absorption for higher order modes. The width provides another tuning element for adjusting the waveguide mode filter efficiency to trade off losses of higher order modes with loss of the fundamental mode. The ridge may be created on one or both sides of the waveguide. Furthermore, the ridge may be patterned to scatter and/or absorb higher order modes.

FIG. 5 c) illustrates a cross-sectional view of a patterned ridge rib waveguide 520, where the characteristics of the material comprising the ridge may be patterned or modulated. For example, material may be etched away in localized regions while remaining intact in others, or may be implanted in localized regions, for example. Similarly, FIG. 5 e) illustrates an oblique view of a rib waveguide 540 with patterned ridge, where the ridges alongside the rib are etched periodically. The periodicity may be configured to scatter particular frequency higher order modes.

Figure 6:
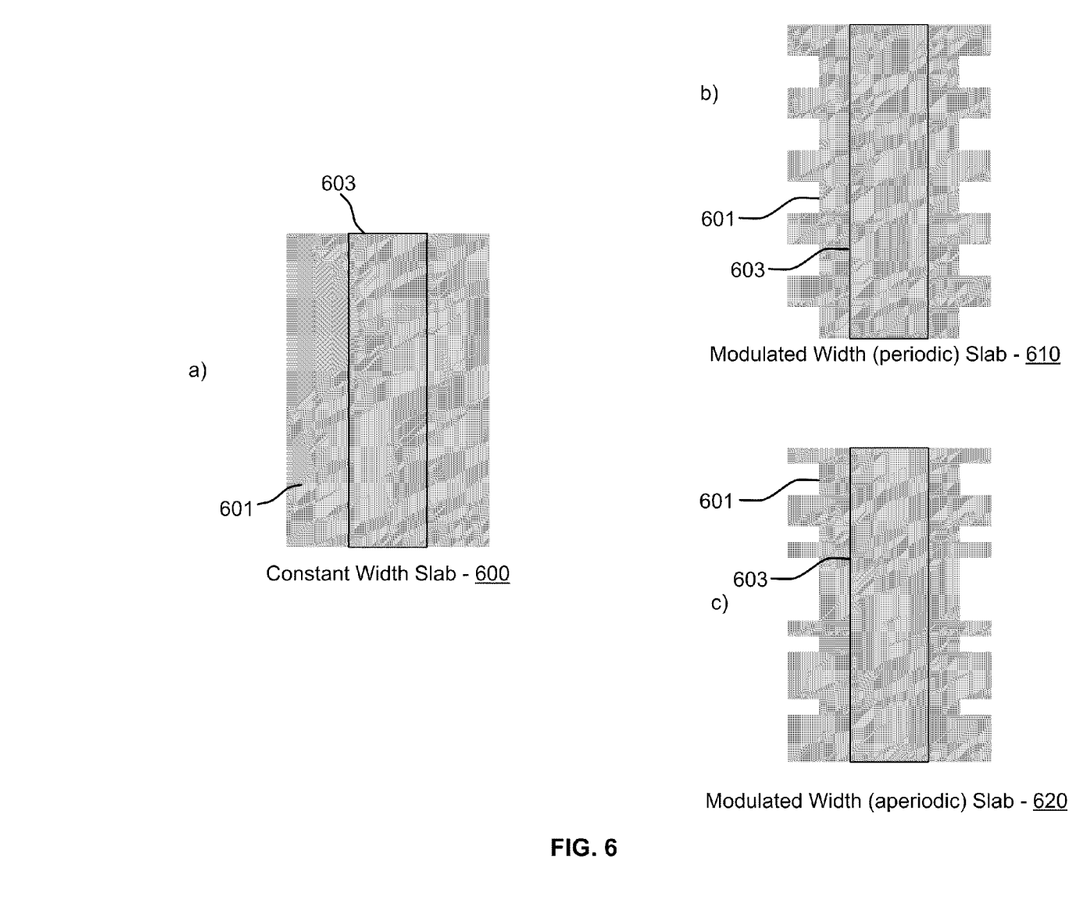
FIG. 6 is a block diagram of exemplary rib optical waveguides, in accordance with an embodiment of the invention.

FIG. 6 is a block diagram of exemplary rib optical waveguides, in accordance with an embodiment of the invention. Referring to FIG. 6, there is shown top views of a) a constant width slab rib waveguide 600, b) a periodicically modulated width rib waveguide 610, and c) an aperiodically modulated width rib waveguide 620. The width of the slab 601 may be varied periodically and/or aperiodically to be tuned for a particular frequency higher-order mode. The width modulation may be defined using the trench etch that is used to define the slab 601, for example, and may couple higher order modes that have small absorption or scattering coefficients to other higher order modes that have large absorption or scattering coefficients. The width modulation may also be asymmetric with respect to the waveguide centerline.

FIG. 6 a) illustrates a constant-width slab rib waveguide 600 where higher-level modes may propagate in the slab if no doping, patterning, or width modulation is utilized. FIG. 6 b) illustrates a modulated width slab rib waveguide 610, where the width variation is periodic to couple selected higher-order modes to radiation modes. The period and spacing of the variations may be configured to for specific undesired higher order modes. Similarly, FIG. 6 c) illustrates a modulated width rib waveguide 620 where the width variation is aperiodic. These width modulations may cause random scattering losses of the higher order modes.

In another embodiment of the invention, the ridge width may be modulated to couple higher order modes that have small absorption or scattering coefficients to other higher order modes that have large absorption or scattering coefficients. Additionally, if the slab is extended in a direction perpendicular to the waveguide, the higher order modes may be even more efficiently filtered by the above filters.

Figure 7:
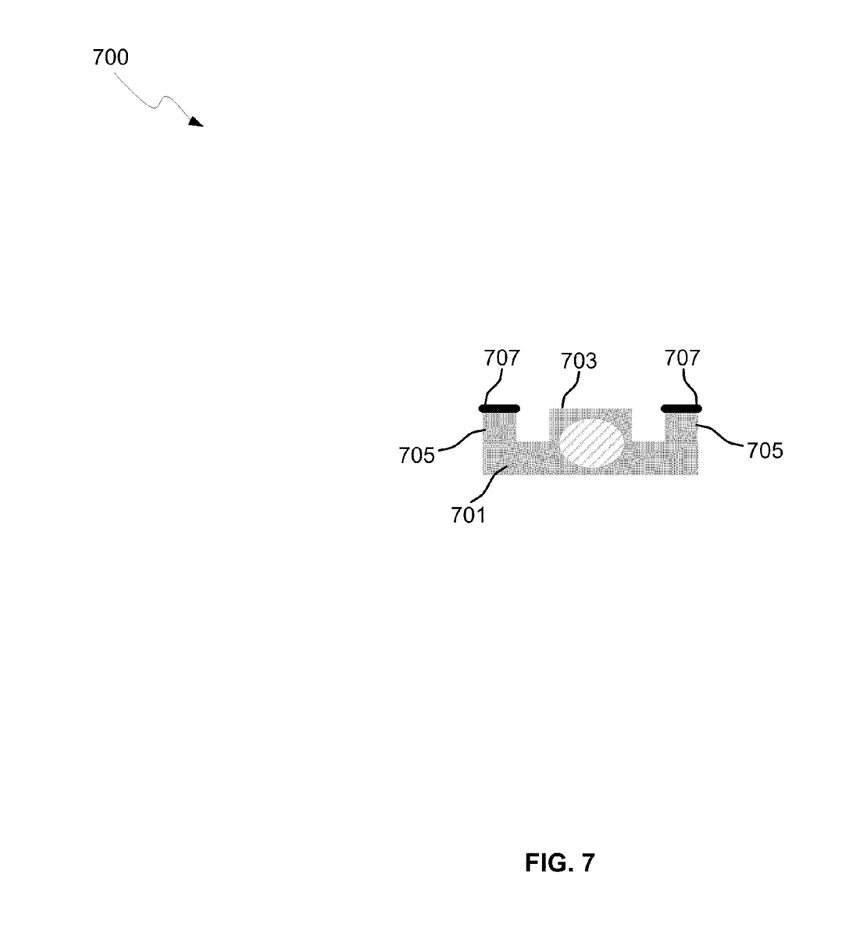
FIG. 7 is a block diagram of an exemplary salicided rib optical waveguide, in accordance with an embodiment of the invention.

FIG. 7 is a block diagram of an exemplary salicided rib optical waveguide, in accordance with an embodiment of the invention. Referring to FIG. 7, there is shown a salicided rib waveguide 700 comprising a slab 701, a rib 703, ridges 705, and salicided regions 707. The slab, rib, and ridges may be as described previously, but with the ridges salicided in a salicide module in a CMOS process to induce absorption for the higher order optical modes. In addition, the ridges 705 may also be doped for attenuation and/or contact purposes.

The rib waveguide filters are not limited to the exact embodiments shown in the figures. Combinations of the above methods and structures may also further improve the efficiency of the filtering process. For example, one or more ends of the slab may be doped as well as salicided. Alternatively, the salicidation may be combined with a ridge width modulation. In another embodiment of the invention, the doping may be combined with patterning.

In an embodiment of the invention, a method and system are disclosed for processing optical signals of a fundamental mode and higher order modes by filtering the higher-order modes in rib waveguides 220, 330, 400, 500, 510, 520, 530, 540, 600, 610, 620, 700 in a photonic chip 130. The higher-order modes may be filtered utilizing doped regions 500 and/or patterns 510 in one or more slab sections in the rib waveguides 220, 330, 400, 500, 510, 520, 530, 540, 600, 610, 620, 700. The patterns may be periodic 610 or aperiodic 620 along the rib waveguides 220, 330, 400, 500, 510, 520, 530, 540, 600, 610, 620, 700. The higher-order modes may be filtered utilizing varying widths of slab sections 610, 620, or doped 500, 705, patterned 520, and/or salicided ridges 707 on the slab sections in the rib waveguides 220, 330, 400, 500, 510, 520, 530, 540, 600, 610, 620, 700. The higher-order modes may be attenuated by scattering and/or absorbing the modes. The chip may comprise a CMOS photonic chip 130.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing optical signals, the method comprising:

in a chip comprising a photonic circuit, said photonic circuit comprising one or more rib waveguides for processing optical signals, said one or more rib waveguides supporting a fundamental mode and one or more higher-order modes:

filtering said one or more higher-order modes utilizing doped regions in one or more slab sections in said one or more rib waveguides while allowing said fundamental mode to propagate.

2. The method according to claim 1, comprising filtering said one or more higher-order modes utilizing patterns fabricated in one or more slab sections in said one or more rib waveguides.

3. The method according to claim 2, wherein said patterns are periodic along said one or more rib waveguides.

4. The method according to claim 2, wherein said patterns are aperiodic along said one or more rib waveguides.

5. The method according to claim 1, comprising filtering said one or more higher-order modes utilizing varying widths of one or more slab sections in said one or more rib waveguides.

6. The method according to claim 1, comprising filtering said one or more higher-order modes utilizing doped ridges formed on one or more slab sections in said one or more rib waveguides.

7. The method according to claim 1, comprising filtering said one or more higher-order modes utilizing patterned ridges formed on one or more slab sections in said one or more rib waveguides.

8. The method according to claim 1, comprising filtering said one or more higher-order modes by scattering said higher-order modes.

9. The method according to claim 1, comprising filtering said one or more higher-order modes by absorbing said higher-order modes.

10. The method according to claim 1, comprising filtering said one or more higher-order modes utilizing salicided ridges formed on one or more slab sections in said one or more rib waveguides.

11. The method according to claim 1, wherein said chip comprises a CMOS photonic chip.

12. A system for processing optical signals, the system comprising:

a photonic circuit, said photonic circuit comprising one or more rib waveguides for processing optical signals, said one or more rib waveguides supporting a fundamental mode and one or more higher-order modes, said one or more rib waveguides being operable to:

filter said one or more higher-order modes utilizing doped regions in one or more slab sections in said one or more rib waveguides while allowing said fundamental mode to propagate through said one or more rib waveguides.

13. The system according to claim 12, wherein said one or more rib waveguides are operable to filter said one or more higher-order modes utilizing patterns fabricated in one or more slab sections in said one or more rib waveguides.

14. The system according to claim 13, wherein said patterns are periodic along said one or more rib waveguides.

15. The system according to claim 13, wherein said patterns are aperiodic along said one or more rib waveguides.

16. The system according to claim 12, wherein said one or more rib waveguides are operable to filter said one or more higher-order modes utilizing varying widths of one or more slab sections in said one or more rib waveguides.

17. The system according to claim 12, wherein said one or more rib waveguides are operable to filter said one or more higher-order modes utilizing doped ridges formed on one or more slab sections in said one or more rib waveguides.

18. The system according to claim 12, wherein said one or more rib waveguides are operable to filter said one or more higher-order modes utilizing patterned ridges formed on one or more slab sections in said one or more rib waveguides.

19. The system according to claim 12, wherein said one or more rib waveguides are operable to filter said one or more higher-order modes by scattering said higher-order modes.

20. The system according to claim 12, wherein said one or more rib waveguides are operable to filter said one or more higher-order modes by absorbing said higher-order modes.

21. The system according to claim 12, wherein said one or more rib waveguides are operable to filter said one or more higher-order modes utilizing salicided ridges formed on one or more slab sections in said one or more rib waveguides.

22. The system according to claim 12, wherein said chip comprises a CMOS photonic chip.

23. A method for processing optical signals, the method comprising:

in a chip comprising a photonic circuit, said photonic circuit comprising one or more rib waveguides for processing optical signals, said one or more rib waveguides supporting a fundamental mode and one or more higher-order modes:

filtering said one or more higher-order modes utilizing patterns fabricated in one or more slab sections in said one or more rib waveguides while allowing said fundamental mode to propagate, wherein said patterns are aperiodic along said one or more rib waveguides.

24. The method according to claim 23, comprising filtering said one or more higher-order modes utilizing varying widths of one or more slab sections in said one or more rib waveguides.

25. The method according to claim 23, comprising filtering said one or more higher-order modes utilizing doped ridges formed on one or more slab sections in said one or more rib waveguides.

26. The method according to claim 23, comprising filtering said one or more higher-order modes utilizing patterned ridges formed on one or more slab sections in said one or more rib waveguides.

27. The method according to claim 23, comprising filtering said one or more higher-order modes by scattering said higher-order modes.

28. The method according to claim 23, comprising filtering said one or more higher-order modes by absorbing said higher-order modes.

29. The method according to claim 23, comprising filtering said one or more higher-order modes utilizing salicided ridges formed on one or more slab sections in said one or more rib waveguides.

30. The method according to claim 23, wherein said chip comprises a CMOS photonic chip.

31. A system for processing optical signals, the system comprising:

a photonic circuit, said photonic circuit comprising one or more rib waveguides for processing optical signals, said one or more rib waveguides supporting a fundamental mode and one or more higher-order modes, said one or more rib waveguides being operable to:

filter said one or more higher-order modes utilizing patterns fabricated in one or more slab sections in said one or more rib waveguides while allowing said fundamental mode to propagate through said one or more rib waveguides, wherein said patterns are aperiodic along said one or more rib waveguides.

32. The system according to claim 31, wherein said one or more rib waveguides are operable to filter said one or more higher-order modes utilizing varying widths of one or more slab sections in said one or more rib waveguides.

33. The system according to claim 31, wherein said one or more rib waveguides are operable to filter said one or more higher-order modes utilizing doped ridges formed on one or more slab sections in said one or more rib waveguides.

34. The system according to claim 31, wherein said one or more rib waveguides are operable to filter said one or more higher-order modes utilizing patterned ridges formed on one or more slab sections in said one or more rib waveguides.

35. The system according to claim 31, wherein said one or more rib waveguides are operable to filter said one or more higher-order modes by scattering said higher-order modes.

36. The system according to claim 31, wherein said one or more rib waveguides are operable to filter said one or more higher-order modes by absorbing said higher-order modes.

37. The system according to claim 31, wherein said one or more rib waveguides are operable to filter said one or more higher-order modes utilizing salicided ridges formed on one or more slab sections in said one or more rib waveguides.

38. The system according to claim 31, wherein said chip comprises a CMOS photonic chip.

39. A method for processing optical signals, the method comprising:

in a chip comprising a photonic circuit, said photonic circuit comprising one or more rib waveguides for processing optical signals, said one or more rib waveguides supporting a fundamental mode and one or more higher-order modes:

filtering said one or more higher-order modes utilizing doped ridges formed on one or more slab sections in said one or more rib waveguides while allowing said fundamental mode to propagate.

40. The method according to claim 39, comprising filtering said one or more higher-order modes utilizing patterns fabricated in one or more slab sections in said one or more rib waveguides.

41. The method according to claim 40, wherein said patterns are periodic along said one or more rib waveguides.

42. The method according to claim 39, comprising filtering said one or more higher-order modes utilizing varying widths of one or more slab sections in said one or more rib waveguides.

43. The method according to claim 39, comprising filtering said one or more higher-order modes utilizing patterned ridges formed on one or more slab sections in said one or more rib waveguides.

44. The method according to claim 39, comprising filtering said one or more higher-order modes by scattering said higher-order modes.

45. The method according to claim 39, comprising filtering said one or more higher-order modes by absorbing said higher-order modes.

46. The method according to claim 39, comprising filtering said one or more higher-order modes utilizing salicided ridges formed on one or more slab sections in said one or more rib waveguides.

47. The method according to claim 39, wherein said chip comprises a CMOS photonic chip.

48. A system for processing optical signals, the system comprising:

a photonic circuit, said photonic circuit comprising one or more rib waveguides for processing optical signals, said one or more rib waveguides supporting a fundamental mode and one or more higher-order modes, said one or more rib waveguides being operable to:

filter said one or more higher-order modes utilizing doped ridges formed on one or more slab sections in said one or more rib waveguides while allowing said fundamental mode to propagate through said one or more rib waveguides.

49. The system according to claim 48, wherein said one or more rib waveguides are operable to filter said one or more higher-order modes utilizing patterns fabricated in one or more slab sections in said one or more rib waveguides.

50. The system according to claim 49, wherein said patterns are periodic along said one or more rib waveguides.

51. The system according to claim 48, wherein said one or more rib waveguides are operable to filter said one or more higher-order modes utilizing varying widths of one or more slab sections in said one or more rib waveguides.

52. The system according to claim 48, wherein said one or more rib waveguides are operable to filter said one or more higher-order modes utilizing patterned ridges formed on one or more slab sections in said one or more rib waveguides.

53. The system according to claim 48, wherein said one or more rib waveguides are operable to filter said one or more higher-order modes by scattering said higher-order modes.

54. The system according to claim 48, wherein said one or more rib waveguides are operable to filter said one or more higher-order modes by absorbing said higher-order modes.

55. The system according to claim 48, wherein said one or more rib waveguides are operable to filter said one or more higher-order modes utilizing salicided ridges formed on one or more slab sections in said one or more rib waveguides.

56. The system according to claim 48, wherein said chip comprises a CMOS photonic chip.

57. A method for processing optical signals, the method comprising:

in a chip comprising a photonic circuit, said photonic circuit comprising one or more rib waveguides for processing optical signals, said one or more rib waveguides supporting a fundamental mode and one or more higher-order modes:

filtering said one or more higher-order modes utilizing salicided ridges formed on one or more slab sections in said one or more rib waveguides while allowing said fundamental mode to propagate.

58. The method according to claim 57, comprising filtering said one or more higher-order modes utilizing patterns fabricated in one or more slab sections in said one or more rib waveguides.

59. The method according to claim 58, wherein said patterns are periodic along said one or more rib waveguides.

60. The method according to claim 57, comprising filtering said one or more higher-order modes utilizing varying widths of one or more slab sections in said one or more rib waveguides.

61. The method according to claim 57, comprising filtering said one or more higher-order modes utilizing patterned ridges formed on one or more slab sections in said one or more rib waveguides.

62. The method according to claim 57, comprising filtering said one or more higher-order modes by scattering said higher-order modes.

63. The method according to claim 57, comprising filtering said one or more higher-order modes by absorbing said higher-order modes.

64. The method according to claim 57, wherein said chip comprises a CMOS photonic chip.

65. A system for processing optical signals, the system comprising:
a photonic circuit, said photonic circuit comprising one or more rib waveguides for processing optical signals, said one or more rib waveguides supporting a fundamental mode and one or more higher-order modes, said one or more rib waveguides being operable to:
filter said one or more higher-order modes utilizing salicided ridges formed on one or more slab sections in said one or more rib waveguides while allowing said fundamental mode to propagate through said one or more rib waveguides.

66. The system according to claim 65, wherein said one or more rib waveguides are operable to filter said one or more higher-order modes utilizing patterns fabricated in one or more slab sections in said one or more rib waveguides.

67. The system according to claim 66, wherein said patterns are periodic along said one or more rib waveguides.

68. The system according to claim 65, wherein said one or more rib waveguides are operable to filter said one or more higher-order modes utilizing varying widths of one or more slab sections in said one or more rib waveguides.

69. The system according to claim 65, wherein said one or more rib waveguides are operable to filter said one or more higher-order modes utilizing patterned ridges formed on one or more slab sections in said one or more rib waveguides.

70. The system according to claim 65, wherein said one or more rib waveguides are operable to filter said one or more higher-order modes by scattering said higher-order modes.

71. The system according to claim 65, wherein said one or more rib waveguides are operable to filter said one or more higher-order modes by absorbing said higher-order modes.

72. The system according to claim 65, wherein said chip comprises a CMOS photonic chip.

* * * * *